United States Patent
Holmes et al.

(10) Patent No.: US 7,363,378 B2
(45) Date of Patent: Apr. 22, 2008

(54) TRANSPORT SYSTEM FOR INSTANT MESSAGING

(75) Inventors: John Holmes, Redmond, WA (US); David Michael Miller, Redmond, WA (US); Walter VonKoch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 10/611,575

(22) Filed: Jul. 1, 2003

(65) Prior Publication Data

US 2005/0005014 A1 Jan. 6, 2005

(51) Int. Cl.
*G06F 15/16* (2006.01)
*G06F 15/173* (2006.01)
*G06F 15/177* (2006.01)

(52) U.S. Cl. .................. 709/227; 709/203; 709/205

(58) Field of Classification Search ........ 709/200–206, 709/217–228
See application file for complete search history.

(56) References Cited

U.S. PATENT DOCUMENTS

| | | | |
|---|---|---|---|
| 5,278,955 A | 1/1994 | Forte et al. | |
| 5,987,515 A | 11/1999 | Ratcliff et al. | |
| 6,003,088 A | 12/1999 | Houston et al. | |
| 6,292,880 B1 | 9/2001 | Mattis et al. | |
| 6,434,568 B1 | 8/2002 | Bowman-Amuah | |
| 6,453,294 B1 | 9/2002 | Dutta et al. | |
| 6,463,078 B1 | 10/2002 | Engstrom et al. | |
| 6,490,615 B1 | 12/2002 | Dias et al. | |
| 6,535,867 B1 | 3/2003 | Waters | |
| 6,549,937 B1 | 4/2003 | Auerbach et al. | |
| 6,594,665 B1 | 7/2003 | Sowa et al. | |
| 6,813,690 B1 | 11/2004 | Lango et al. | |
| 7,080,139 B1 | 7/2006 | Briggs et al. | |
| 7,127,613 B2 | 10/2006 | Pabla et al. | |
| 7,203,356 B2 | 4/2007 | Gokturk et al. | |
| 2001/0025280 A1 | 9/2001 | Mandato et al. | |
| 2002/0077135 A1 | 6/2002 | Hyon | |
| 2002/0178230 A1 | 11/2002 | Aggarwal et al. | |
| 2002/0184309 A1 | 12/2002 | Danker et al. | |
| 2003/0065721 A1 | 4/2003 | Roskind | |
| 2003/0177184 A1* | 9/2003 | Dickerman et al. | 709/204 |

(Continued)

FOREIGN PATENT DOCUMENTS

EP 0665670 8/1995

OTHER PUBLICATIONS

Rosenberg, J., Weinberger, J., Huitema, C., Mahy, R., "STUN-Simple Traversal of User Datagram Protocol (UDP) Through Network Address Translators (NATS)," Request for Comments: 3489, Network Working Group, Mar. 2003, pp. 1-32, The Internet Society.

(Continued)

*Primary Examiner*—Haresh Patel
(74) *Attorney, Agent, or Firm*—Lee & Hayes, PLLC (57) ABSTRACT

An exemplary method involves creating a master session over a first connection through a server; and creating a virtual channel over the connection, the virtual channel operable to communicate a feature session. The method may involve establishing a direct connection that bypasses the server, and switching communication of the feature session to the direct connection. A system for network communication includes a plurality of transport bridges, each transport bridge corresponding to an active network device configuration, and a switching module operable to choose one of the transport bridges to form a connection between two computing devices based on the active network device configuration.

4 Claims, 8 Drawing Sheets

U.S. PATENT DOCUMENTS

| | | |
|---|---|---|
| 2003/0208543 A1 | 11/2003 | Enete et al. |
| 2004/0018858 A1 | 1/2004 | Nelson |
| 2004/0070567 A1 | 4/2004 | Longe et al. |
| 2004/0153517 A1 | 8/2004 | Gang et al. |
| 2005/0004993 A1 | 1/2005 | Miller et al. |

OTHER PUBLICATIONS

Campbell B. et al. "Instant Message Sessions in SIMPLE", Internet-Draft, Jun. 30, 2003 (Jun. 3, 2003).

Handley, M. "Germ: Generic RTP Multiplexing" Internet Engineering Task Force, XX, XX, Nov. 1, 1998 (Nov. 11, 1998), pp. 1-7.

U.S. Appl. No. 10/611,575; Holmes, et al.; filed Jul. 1, 2003.

U.S. Appl. No. 10/611,599; Miller, et al.; filed Jul. 1, 2003.

U.S. Appl. No. 10/987,396; Zlateff, et al.; filed Nov. 12, 2004.

U.S. Appl. No. 11/111,532; Zlateff, et al.; filed Apr. 21, 2005.

"New Tunneling Techniques", Cisco Systems, available online at www.cisco.com, accessed Jun. 6, 2003, 3 pages.

* cited by examiner

TRANSPORT SYSTEM FOR INSTANT MESSAGING

CROSS-REFERENCE TO RELATED APPLICATION

The present application is related to co-pending U.S. patent application Ser. No. 10/611,599, entitled "Instant Messaging Object Store," by David Michael Miller, John Holmes, and Walter vonKoch, which is filed concurrently herewith, assigned to the assignee of the present application, and incorporated herein by reference for all that it teaches and discloses.

TECHNICAL FIELD

The described subject matter relates to computer communications. More particularly, the subject matter relates to a transport system for instant messaging.

BACKGROUND

Instant messaging is becoming a very popular communications tool for users of computer devices. An instant messaging (IM) application (e.g., WINDOWS® Messenger system of Microsoft Corporation of Redmond, Wash., Yahoo! Messenger, AOL instant messenger (AIM), and the like) enables a user to engage in a real time conversation with one or more contacts, who are identified in the user's private list of contacts. Typically, private lists are stored on a server and a conversation is established through a switchboard, or relay server, which directs inbound messages to the appropriate recipients.

Routing real time messages through the switchboard can be slower and more costly (in terms of server resources) than instant messaging in a peer-to-peer arrangement, wherein the messages do not go through a switchboard, but pass directly to and from participants in the conversation. Thus, after a conversation is established using a switchboard server, a typical instant messaging system may attempt to convert the conversation into a peer-to-peer configuration. Converting to peer-to-peer may be done a number of ways, typically involving identifying a peer by an internet protocol (P) address and/or port number, whereby messages can be sent directly to the peer.

However, creating a peer-to-peer conversation can be difficult if not impossible in situations involving active network devices, such as firewalls or network address translators (NATs). Such devices are used for system security, but are typically designed to prevent direct access to computers behind such devices. For example, a NAT has its own IP address, and computers behind the NAT have their own IP addresses, which are private; i.e., other computers outside the NAT may not be able to determine the IP addresses of the computers behind the NAT. The IP address of a message received by the NAT is translated to the IP address of the recipient computer behind the NAT. Various techniques may be applied to tunnel through or traverse an active network device to form a direct connection.

As instant messaging systems improve, they typically provide more features, besides text, that make the conversation a richer experience. For example, an instant messaging system may allow a user to transmit audio, video, or a custom user tile (also referred to as a Display Picture) uniquely associated with the user. Such features typically require more resources, such as transmission bandwidth, than text to include in a conversation. Thus, a peer-to-peer connection is desirable when carrying on an instant messaging conversation because peer-to-peer typically provides higher performance than a connection through a switchboard server.

SUMMARY

Implementations described and claimed herein solve the discussed problems, and other problems.

An exemplary method involves creating a master session over a first connection through a server; and creating a virtual channel over the connection, the virtual channel operable to communicate a feature session. The method may involve establishing a direct connection that bypasses the server, and switching communication of the feature session to the direct connection.

A system for network communication includes a plurality of transport bridges, each transport bridge corresponding to an active network device configuration, and a switching module operable to choose one of the transport bridges to form a connection between two computing devices based on the active network device configuration.

DETAILED DESCRIPTION

Turning to the drawings, wherein like reference numerals refer to like elements, various methods are illustrated as being implemented in a suitable computing environment. Although not required, various exemplary methods will be described in the general context of computer-executable instructions, such as program modules, being executed by a personal computer and/or other computing device. Generally, program modules include routines, programs, objects, components, data structures, etc. that perform particular tasks or implement particular abstract data types.

Moreover, those skilled in the art will appreciate that various exemplary methods may be practiced with other computer system configurations, including hand-held devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Exemplary Network Environment for Instant Messaging

Figure 1:
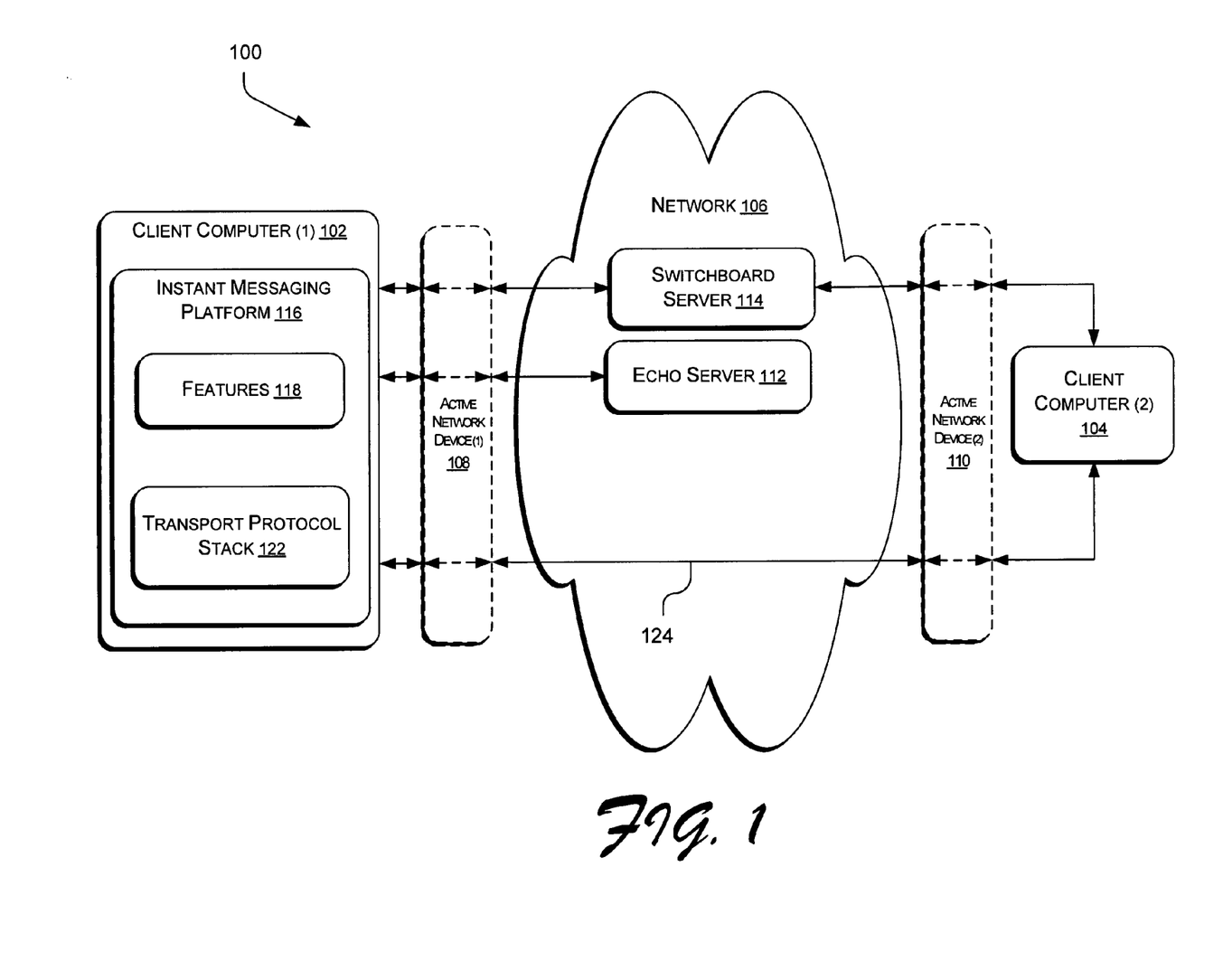
FIG. 1 is a block diagram depicting components in an exemplary instant messaging system.

FIG. 1 illustrates an exemplary network environment 100 for an instant messaging conversation. Generally, two clients 102 and 104 can communicate with each other via a network 106. Active network devices 108 and 110 may or may not be present in the network environment 100. An echo server 112 and a switchboard server 114 may be connected via the network 106 to facilitate communication between clients 102 and 104.

An instant messaging (IM) platform 116 enables the client (1) 102 and the client (2) 104 to engage in an instant messaging conversation. A user of the IM platform 116 interacts with the IM platform 116 via a user interface (not shown) to send and receive messages to and from the client (2) 104. The IM platform 116 includes features 118 (also called end user features (EUFs)) and a transport protocol stack 122 that facilitate communication of data between the client (1) 102 and the client (2) 104.

More specifically, the transport protocol stack 122 transparently establishes an instant messaging session based on characteristics of the network environment 100. In general, the established session may be through the switchboard (SB) server 114 or, alternatively, via a peer-to-peer connection 124, whereby data is not routed through the SB server 114.

The clients 102 and 104 may access the network 106 via an internet service provider (not shown), or otherwise. In one embodiment, the clients 102 and 104 each have unique network addresses, ports, and/or identifiers, whereby communications can be established between the clients 102 and 104. For example, the SB server 114 can route data to the client computer (2) 104 using the client computer's (2) 104 network address, port, and/or identifier. Over a peer-to-peer connection 124, the client computer (1) 102 can directly send data to the client computer (2) 104, using the client computer's (2) 104 network address, port, and/or identifier.

As discussed, active network device (1) 106 and active network device (2) 110 may or may not be present. Examples of active network devices are firewalls and network address translators, which provide system security for their respective client devices. Thus, the active network device (2) 110 may provide security for the client computer (2) 104, and the active network device (1) 108 may provide security for the client computer (2) 102.

Various network configurations are therefore possible. In one network configuration, the active network device (1) 108 is present, but the active network device (2) 110 is not present. In another network configuration, the active network device (2) 110 is present, but the active network device (1) 108 is not present. In another network configuration, neither the active network device (1) 108, nor the active network device (2) 110 are present. In a fourth network configuration, both the active network device (1) 108 and the active network device (2) 110 are present.

The active network devices 108 and 110 may have unique network addresses, such as internet protocol (IP) addresses, whereby the active network devices 108 and 110 receive data bound for their respective clients 102 and 104. Active network devices 108 or 110 receive data on their network addresses and translate the network addresses to the network addresses associated with their respective clients 102 and 104.

The client (1) 102 can use the echo server 112 to obtain the network address associated with the active network device (1) 108. The client (1) can send the echo server 112 a message. When the echo server 112 receives the message from the client (1) 102, the message will include the network address of the active network device 108. In response, the echo server 112 sends the network address of the active network device 108 back to the client 102. The client (2) 104 may similarly obtain the network address of the active network device (2) 110. Using the network addresses of the active network devices 108 and 110, the clients 102 and 104 may be able to establish a peer-to-peer connection 124.

Although the exemplary environment 100 in FIG. 1 depicts only two clients 102 and 104 in a conversation, it is to be understood that more than two clients may be involved in a conversation. Two or more clients may communicate in a multipoint fashion, wherein each client may have a peer-to-peer connection to every other client. Alternatively, the two or more clients may engage in the conversation through the switchboard server 114. In addition, any combination of peer-to-peer connections and connections through the switchboard may be implemented in a conversation. More detailed descriptions of exemplary operations and systems that may be employed in the network environment 100 are provided below.

Exemplary Systems for Transporting Instant Messages Among Clients

Figure 2:
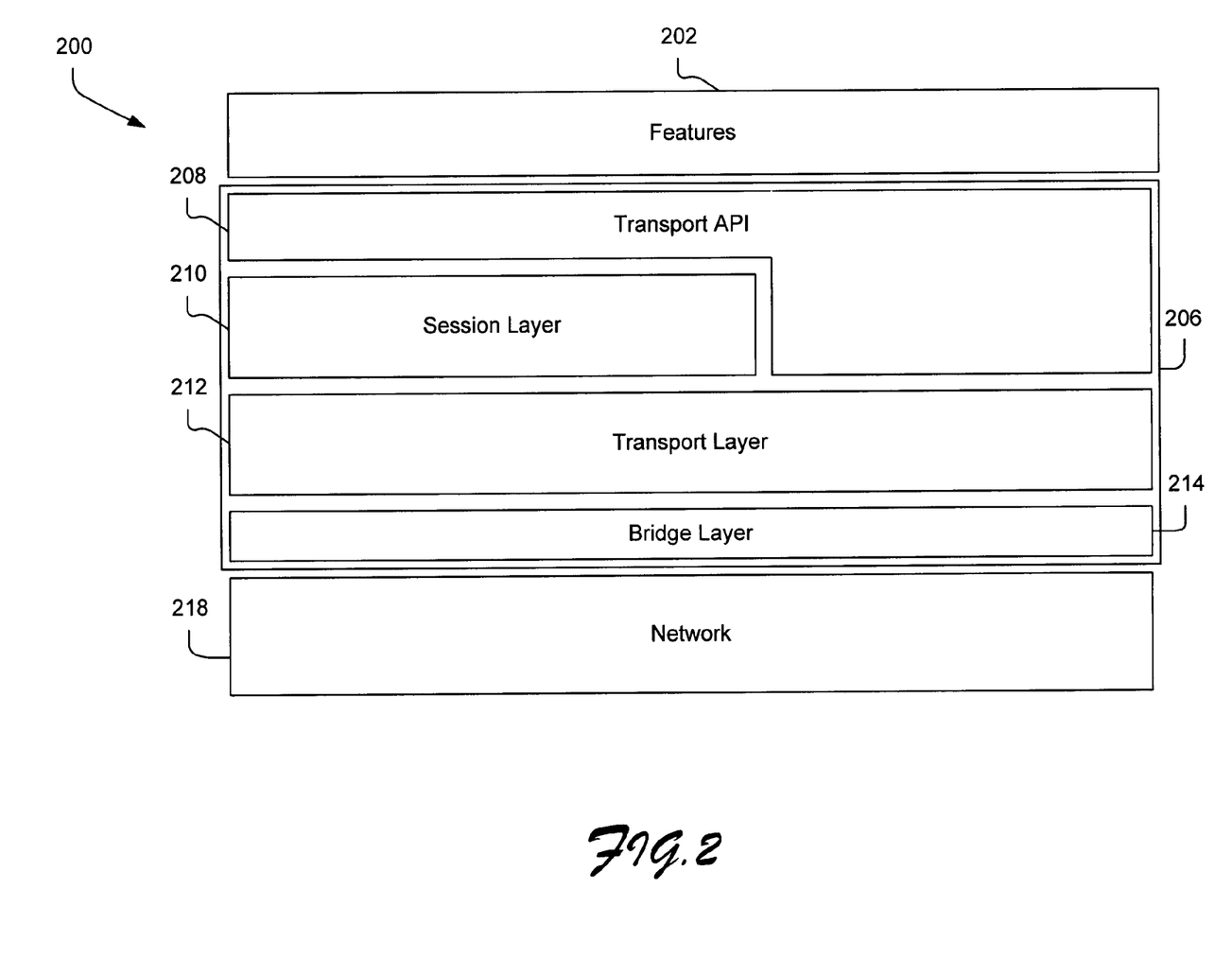
FIG. 2 illustrates a transport system including exemplary layers for managing communication of data in an instant messaging scenario.

FIG. 2 illustrates a transport system 200 including exemplary layers for managing communication of data in an instant messaging scenario. In general, each of the layers 21 provides functionality and/or data for carrying out various tasks associated with the layer. Describing transport protocols and systems in terms of layers is understood by those skilled in the art.

The transport system 200 includes features 202. Features 202 are functions hosted or executed by or within a messenger application (e.g., the instant messaging platform 116, FIG. 1) to present data associated with the feature. A feature may be characterized by the type of data the feature presents, the manner of presenting the data, the operations that the feature may perform on the data, and/or the interactive options that the feature provides to the user to interact with the data. For example, a custom user tile feature presents picture data in a screen tile on the user interface; a file transfer feature enables a user to select a file and send the file to an instant messaging contact. By way of example, but not limitation, the features layer 202 may include emoticons, ink, embedded pictures, and others.

The features 202 use layers in a transport protocol stack 206 to communicate data in an instant messaging scenario. The transport protocol stack 206 transparently manages details of receiving and transmitting data from and to clients in a conversation. The 1 transport protocol stack 206 provides a transport application program interface (API) 208 to the features 202, whereby the features 202 can send and receive data. Lower layers of the transport protocol stack 206 use network configuration data, and information about the data from the features 202, to establish instant messaging sessions. Thus, the transport protocol stack 206 makes lower level details of communicating data transparent to the features 202.

The terms "BLOB" (binary large object) and "chunk" are used herein to refer to portions of data that may be sent and/or received in a network environment, regardless of the type or size of the data. For example, a digital image may be composed of one or more BLOBs of data. A BLOB is composed of one or more chunks of data.

As mentioned above, the exemplary transport API 208 provides methods, or functions, that expose functionality of the transport protocol stack to the features 202. A particular implementation of the API 208 includes the following methods:

| | |
|---|---|
| SendData( ); | // Sends a blob of data to another<br>// client; |
| OnDataReceived( ); | // Callback to feature when associated<br>// session receives a blob of data; |
| RegisterFeatureHandler( ); | // Called by features to register<br>// handlers. The handlers are called<br>// when another client sends an<br>// invitation for the feature. |
| RegisterDataChannelCallBacks( ); | // Called by features to register<br>// handlers that are called when<br>// channel events happen or channel<br>// states changes. |
| CreateDataChannel( ); | // Creates a data channel (session)<br>// for a feature. |
| GetTransportCapabilities( ); | // Returns capabilities of the<br>// conversation, for example Direct,<br>// Indirect, Store and Forward. |
| GetParticipants( ); | // Gets the list of participants<br>// in a conversation. |

To illustrate the exemplary API 208, a feature in the features layer 202 can create a session using the CreateDataChannel( ) function. The feature may call the register RegisterFeatureHandler( ) to register a handler to be called when an invitation is received for the feature. The feature may call RegisterDataChannelCallBacks( ) to register a handler to be called when a channel event occurs. The feature can call SendData( ) to send data to a client. The function OnDataReceived( ) is called by another transport protocol layer, such the session layer 210, when data is received for the feature.

An exemplary session layer 210 includes logic for providing session services to features 202. An instant messaging conversation includes at least one session, called an instant messaging session for carrying on the conversation. An implementation of the SLP also includes a master session, which has control logic for establishing other sessions for the features, called feature sessions. The session layer 210 is the protocol by which the sessions are initiated. In one implementation, the session layer 210 initiates a session by negotiating session establishment between two peers based on the peers' respective capabilities.

In a particular implementation of the session layer 210, a subset of the session initiation protocol (SIP) is employed. In this implementation, messages can be sent in a human-readable format (e.g., Extensible Markup Language (XML), comma separated value (CSV), etc.). Exemplary session management messages are "INVITE", "BYE", "CANCEL", and "ACK."

An exemplary transport layer 212 includes logic for handling a Transport Layer Protocol of the Open System Interconnection (OSI) standard. The TLP is a binary protocol for sending and receiving arbitrary sized binary large objects (BLOBs) via network channels. The transport layer 212 performs various data management tasks. For example, as discussed in further detail below, the transport layer 212 is operable to multiplex data via a network connection to thereby create virtual channels within a single network connection. As discussed in further detail below, transport layer 212 interfaces with one or more transport bridges, such as a TCP bridge or an SB-Bridge, which reside at the transport bridge layer 214. The transport layer 212 may include a scheduler and queues for scheduling data from the features 202 to be transported via bridges in the bridge layer 214.

In a particular implementation, the transport layer 212 appends a TLP header to each chunk of each BLOB that is transported. The header provides information about the BLOB and the chunk. Upon receipt of a chunk, the transport layer 212 can parse the header to determine how chunks should be reassembled and how BLOBS should be re-ordered, if necessary. In one exemplary implementation, the TLP header is as follows:

| | |
|---|---|
| DWORD SessId; | // slave session id that this blob belongs to |
| DWORD BlobId; | // id for this blob |
| UINT64 Offset; | // offset of this chunk's data into the blob's data |
| UINT64 BlobSize; | // total size of all chunks not including headers |
| DWORD ChunkSize; | // size of the data in this chunk (not including<br>// header) |
| DWORD Flags; | // ORed together TLP_CONTROL_FLAGS |

The field "SessId" identifies the session associated with a chunk of data that is being sent or received. The "SessId" field is used by the transport layer 212 to associate a chunk of data with a particular session, and thereby multiplex and/or demultiplex the chunk of data. Data multiplexing employed by the transport protocol stack 206 is described in further detail below.

The field "BlobId" identifies the binary large object (BLOB) corresponding to the data being sent or received. The field "BlobId" may be used by the transport protocol stack 206 to assemble or reassemble chunks into a corresponding BLOB. The "Offset" field represents where a chunk is located in the corresponding BLOB. The BlobId may also be used to organize BLOBs in their proper order before delivery or after receipt. The "BlobSize" field represents the size of the BLOB. The "ChunkSize" field represents the size of the chunk of data, not including the header.

The "Flags" field provides a number of flags used by the transport layer 212 to manage the process of sending and receiving data among clients. Exemplary "Flags" are shown and described as follows:

```
enum TLP_CONTROL_FLAGS
{
    TLP_NAK = 0x01,  // set in a non-acknowledgement packet
                     // (request for retransmit)
    TLP_ACK = 0x02,  // set in an acknowledgement packet
    TLP_RAK = 0x04,  // set in a request for acknowledgement packet
    TLP_RST = 0x08,  // set in a Reset packet, closes the session on
                     // the other side
    TLP_BIG = 0x10,  // set when this chunk is part of a blob that should
                     // be saved as a file
```

-continued

```
    TLP_CAL = 0x20,  // set in a blob for which progress callbacks
                     // are requested
};
```

The transport bridge layer 214 includes logic for transporting data over a network. For example, the transport bridge layer 214 may perform data encoding and/or decoding. In one implementation, the transport bridge layer 214 includes one or more transport bridges that each have functionality corresponding to a network configuration, and data characteristics, for communicating on the network. Exemplary transport bridges, as well as systems and operations for selecting among the bridges, are described in detail below.

In one implementation, the transport layer 214 can use the transport bridge layer 214 to transition between two types of bridges in the midst of a session. Thus, a session may begin over a switchboard (SB) bridge, whereby the session data is communicated through a switchboard server, but, later, the session may switch to a direct, or peer-to-peer connection. In addition, if the peer-to-peer connection is broken, the transport layer 212 can responsively switch back to the SB bridge or some other available bridge in the bridge layer 214. The transport layer 212 handles the switch to a different connection type in a way that is transparent to higher layers of the transport protocol stack 206.

The transport layer 212 works with the bridge layer 214 to ensure that BLOBs are delivered and/or received in proper order. Because the type of connection may change from a slower connection to a faster connection in the midst of a session, BLOBs that were transmitted over the slower connection may arrive at their destination after BLOBs that are transmitted over the faster connection, unless the transport layer 212 takes steps to ensure the proper order. Exemplary operations are described below that ensure a proper sequential order of delivery is maintained.

A network layer 218 represent lower level communications functionality that perform standard network communications functions. The network layer 218 may include, but is not limited to, Transmission Control Protocol/Internet Protocol (TCP/IP) functionality, Universal Datagram Protocol (UDP) functionality, Hypertext Transport Protocol (HTTP) functionality, Simple Object Access Protocol (SOAP). The bridge layer 214 can use the network layer 218 functionality to communicate data via a network.

As discussed herein, a number of transport bridges are provided to handle different network configurations, and data types, formats, and/or sizes. Table 1 illustrates exemplary transport bridges and associated network configurations in which the bridges may be employed.

TABLE 1

| Bridge | No NAT | 1 NAT | 2 NATs (not symmetrical) | 1 UPnP | 1 UPnP & 1 NAT | 2 UPnP | Firewall | Multipoint |
|---|---|---|---|---|---|---|---|---|
| SB | ✓ | ✓ | ✓ | ✓ | ✓ | ✓ | ✓ | ✓ |
| Twister (IPv6) TCP | ✓ | ✓ | ✓ | ✓ | ✓ | ✓ | | |
| RUDP | ✓ | ✓ | ✓ | ✓ | ✓ | ✓ | | |

A checkmark (✓) at an intersection of a row and column in Table 1 indicates that the bridge in the intersecting row can be used in the network configuration in the intersecting column.

The SB Bridge sends traffic via a switchboard server (e.g., the switchboard server 114, FIG. 1). In one implementation, when an instant messaging session is initially established, the SB bridge is the bridge used to transport the instant messaging session data. Subsequently, the SB bridge continues to be used only used if a direct (peer-to-peer) connection cannot be established.

The Twister transport control protocol (TCP) (also called the Internet Protocol Version 5 (IPv6) TCP) bridge can be used to traverse an Internet Protocol Version 4 (IPv4) NAT. In one implementation, the IPv6 bridge utilizes a Teredo tunneling technique to establish a peer-to-peer connection. Teredo is an IPv6/IPv4 transition technology that provides address assignment and host-to-host automatic tunneling for unicast IPv6 connectivity when IPv6/IPv4 hosts are located behind one or multiple IPv4 NATs. To traverse IPv4 NATs, IPv6 packets are sent as IPv4-based User Datagram Protocol (UDP) messages.

The Twister TCP bridge is operable to establish a peer-to-peer TCP/IP connection, even if a network address translator (NAT) is configured on the network. For example, if a first client is behind a NAT, and a second client is not behind a NAT or firewall, the twister TCP bridge of the first client initiates an outgoing TCP connection with the second client. The first client can use an echo server (e.g., the echo server 112, FIG. 1) to detect that the first client is behind the NAT, and thus determine the direction in which to form the connection; i.e., the first client initiates the TCP connection. A similar technique may be applied when one of the clients is behind a Universal Plug and Play (UPnP) NAT.

The Reliable Universal Datagram Protocol (RUDP) bridge communicates data via UDP but emulates a TCP connection by acknowledging receipt of transmission of data much as a "packet" would be acknowledged under TCP. In this fashion, the RUDP bridge provides a more reliable than a traditional UDP connection, because the protocol can detect when data is dropped (i.e., not received) and should be resent. The RUDP bridge may use an echo server to obtain NAT network addresses, so that NATs can be traversed.

The RUDP bridge appends a header to transmitted data. An exemplary header is shown below:

```
unsigned_int64 qwSeqNum;    // sequence number of first byte in this
                            // packet
unsigned_int64 qwAckNum;    // ack number of next byte the sender
                            // of this packet expects
DWORD dwOtherFields;        // 4 bit offset in quadwords, 5 bit reserved,
                            // 5 control bits, 16 reserved, from most
                            // significant
DWORD dwWindow;             // window size receiver will accept
DWORD dwSendTime;           // timestamp for when the packet was sent
DWORD dwEchoTime;           // last timestamp the sender recorded in a
                            // packet from receiver
```

An exemplary RUDP bridge protocol involves sending a "SYN" message to a listening RUDP bridge, responding with "SYN ACK", and responding to the "SYN ACK" message with an "ACK." Subsequently, a retransmit timer will continue to retransmit one or more sets of data until an ACK is received from the responding RUDP bridge for the transmitted (or retransmitted) data sets.

Figure 3:
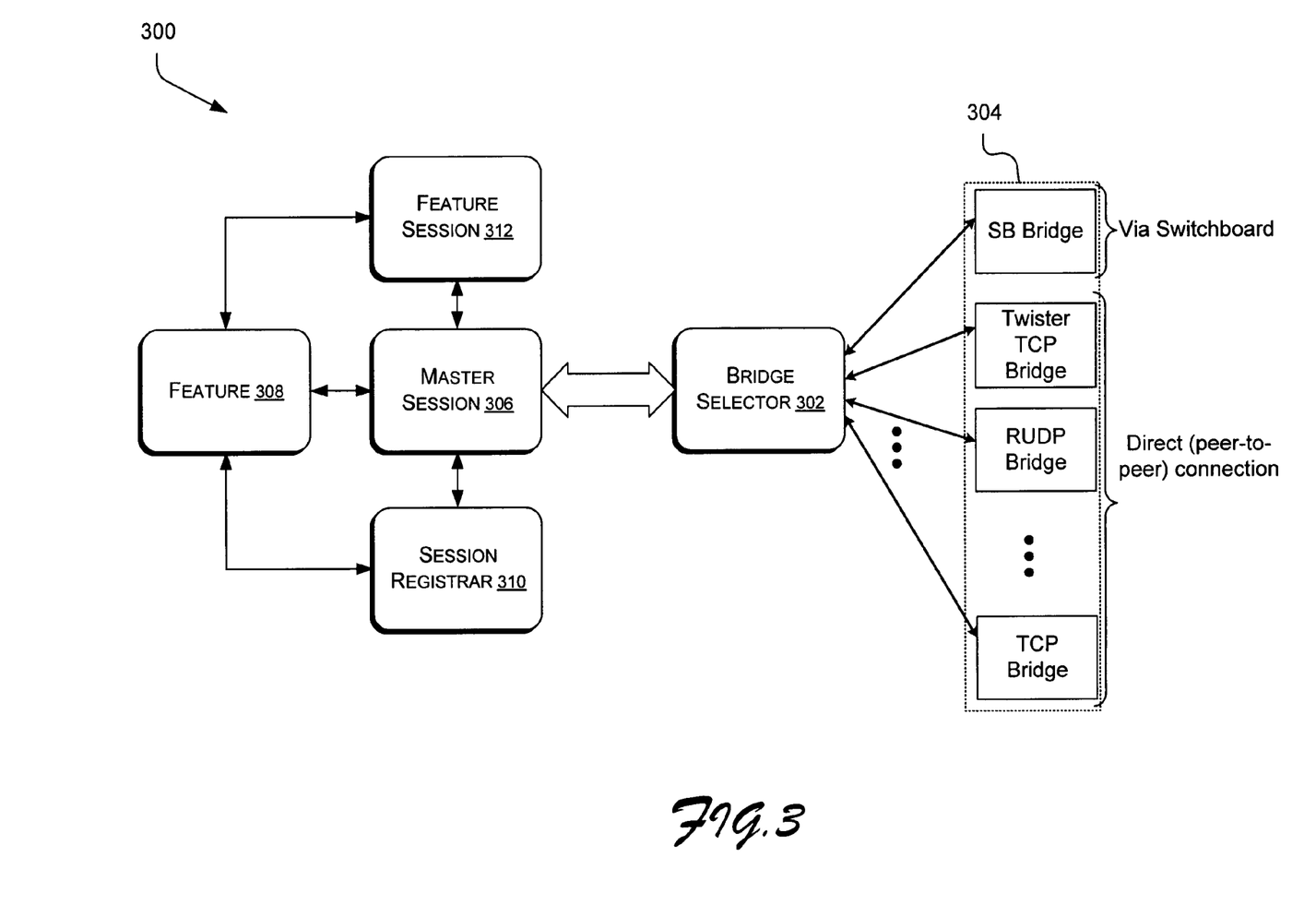
FIG. 3 is a block diagram illustrating an exemplary bridge selection module operable to select a preferred transport bridge.

FIG. 3 is a block diagram illustrating an exemplary selection module 302 operable to select a preferred transport bridge from among a set of transport bridges 304. The instant messaging application may have more than one feature 308, and each feature 308 communicates with a master session 306 and a session registrar 310 to set up an associated feature session 312. Instant messaging data, including feature data, is transported through a selected bridge.

The master session 306 executes at the session layer 210 (FIG. 2) in the transport protocol stack 206 (FIG. 2). The master session 306 is created when a conversation is started in an instant messaging application. The master session 306 is associated with a conversation window and is the object through which features 308 request slave, or feature sessions 312. The master session 306 may also expose a static method that enables features 308 to start a master session outside the context of a conversation window, whereby an instant messaging conversation will be created.

A feature 308 registers with a session registrar 310, which maintains information about features running during a conversation. The session registrar 310 may also maintain information about "auto-start" features. Auto-start features are features that should exist by default and their invite handlers will be invoked at both clients in the conversation with predefined call IDs and session IDs once an underlying switchboard connection is established.

When the feature 308 registers with the session registrar 310, the feature 308 provides an invitation handler function and a globally unique identifier (GUID) associated with the feature 308. The master session 306 can use the feature registrar information to establish the feature session 312, through which the feature 308 can carry on a session with a peer feature.

For example, an invitation from a peer may be received by the master session 306, inviting the feature 308 to enter into a session. The invitation specifies the GUID associated with the feature 308. The master session 306 looks up the GUID in the session registrar 310, to find the invitation handler function associated with the feature 308. If the invitation is accepted by the feature 308, the master session 306 creates the new feature session 312.

The feature 308 may invite a peer feature to enter into a session. To do so, the feature 308 requests a new session from the master session 306 (for example, by calling CreateDataChannel( ) in the transport API 208, FIG. 2)). The request for a new session from the feature 308 can include a request for a type of connection (e.g., direct, non-direct). The master session 306 will call the bridge selector 302 with information such as the direct connection requested, the size of the data, and/or the network configuration. The bridge selector 302 uses the information to identify a preferred transport bridge to use for the requested feature session.

In one implementation, the bridge selector 302 executes at the transport layer 212 (FIG. 2) and implements transport bridge selection rules to select the preferred bridge. In one implementation, the design goal is to send as much traffic directly peer-to-peer as possible, thereby avoiding delays and costs that may be associated with a switchboard server. In this implementation, the following factors are analyzed to select the transport bridge: the direct connection requested, the bandwidth supported by the transport bridge, the size of data to be sent, any limitations of the transport bridge, the cost associated with a particular transport bridge (e.g., relay costs), and/or privacy specifications (e.g., reveal or not reveal IP address).

Each transport bridge computes a score based on the above factors. The bridge gives its score to the bridge selector 302, which chooses the preferred transport bridge based on the scores. Before analyzing the raw scores, the bridge selector 302 takes specified requests into account. For example, if the feature 308 requests a direct connection, then the bridge selector 302 may eliminate all non-direct bridges from the set of candidate bridges. Bridges that will not work in a particular network configuration are also eliminated from the set of candidate bridges. For example, the Twister TCP bridge is not considered if the network configuration includes 2 symmetric legacy NATs. Information obtained from an echo server test during conversation initialization can be used to decide which bridges cannot work.

Thus, one implementation of the bridge selector 302 employs the following transport bridge selection rules:

1. Eliminate bridges that cannot work based on echo test results.
2. Eliminate bridges that won't satisfy specific requests by caller.
3. Use remaining bridge with highest score.
4. If previous bridge fails, use remaining bridge with second highest score.
5. If previous bridge fails, use remaining bridge with next highest, and so on . . .

The bridge selector 302 notifies the master session 306 of the preferred bridge based on the rules. In response, the master session 306 creates the feature session 312 and instantiates the preferred bridge to be used. After the feature session 312 is created, the feature session 312 will be the session through which the feature 308 communicates with other peer features. The feature session 312 handles sending data, as well as session control calls, such as AcceptSession and AcceptDirect.

Figure 4:
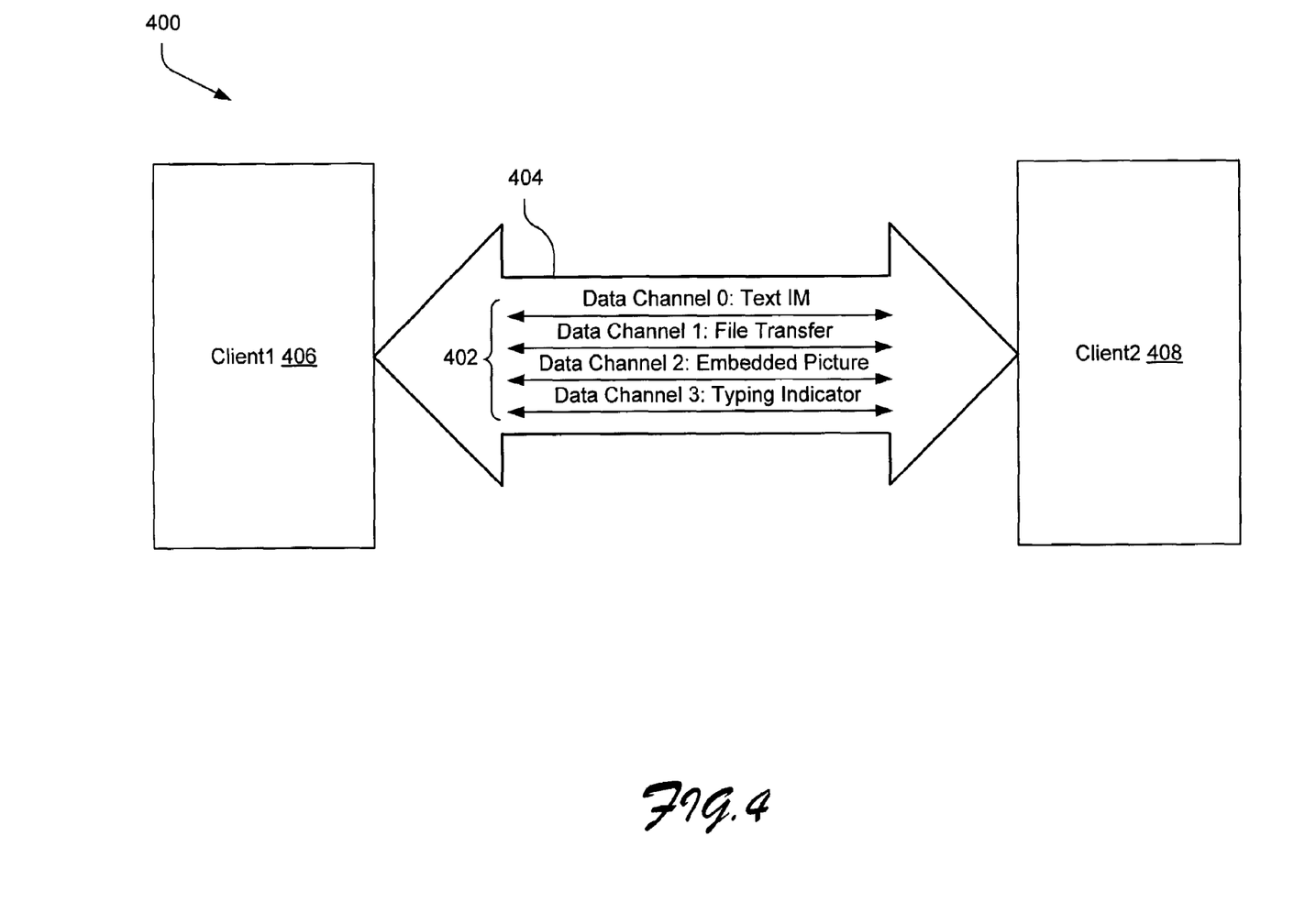
FIG. 4 is a block diagram illustrating virtual channels across a physical connection between two peer devices.

FIG. 4 is a block diagram illustrating virtual channels 402 across a physical connection 404 between a first client device 406 and a second client device 408. The connection 404 and the channels 402 are used by the client devices 406 and 408 to engage in an instant messaging conversation, wherein data of various types is communicated. Although the devices 406 and 408 are referred to as "client devices," it is to be understood that the connection 404 between the devices 406 and 408 need not be through a server, but could be a direct, or peer-to-peer connection.

As shown, data channel 0 is used to communicate text messages in the conversation; data channel 1 is used to transfer files between the client devices 406 and 408; data channel 2 is used to transfer embedded pictures between the devices 406 and 408; and data channel 3 is used to communicate typing indicator information that indicates whether a user is currently typing a message at one of the devices 406 or 408.

The virtual channel number corresponds to a session identifier. As discussed above, a header (see the TLP header above) is appended to data communicated over the connection 404. The header includes a "SessId" which indicates which session, and which channel, (e.g., feature or master) the data corresponds to. Using the SessId, data from multiple sessions can be multiplexed over the connection 404. Thus, the channels 402 are considered "virtual" channels. The SessId is stripped off received data at the client devices 406 and 408 and the data is routed to the appropriate session associated with the SessId.

In another implementation, more than one connection is established between the client device 406 and the client device 408, and each of the connections can include multiple virtual channels. For example, when a conversation is initially created between the client device 406 and the client device 408, a master session will be created via a connection through a switchboard server. Later, a peer-to-peer connection may be established between the client devices 406 and 408. In this situation, features on the devices 406 and 408 may establish virtual channels on either the switchboard connection or the peer-to-peer connection.

Exemplary Operations Employing a Transport Protocol Stack

Figure 5:
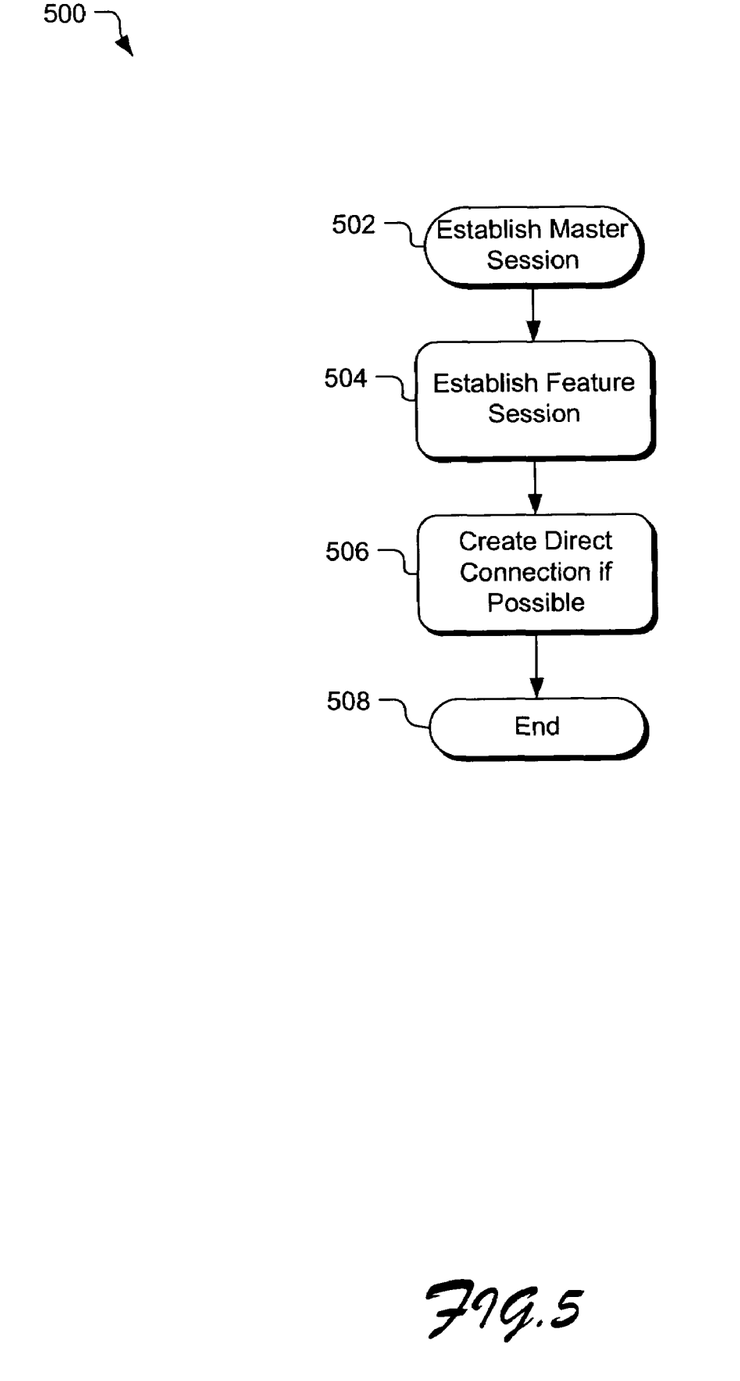
FIG. 5 illustrates an operation flow having exemplary operations for establishing a feature session within a master session and creating a direct connection if possible.

FIG. 5 illustrates an operation flow 500 having exemplary operations for establishing a feature session within a master session and creating a direct connection if possible. The operation flow 500 may be carried out by a client device, such as the client computer (1) 102, shown in FIG. 1, in order to engage in an instant messaging conversation with another client device.

An establishing operation 502 establishes a master session. The master session is established when a user initially launches the messenger application and attempts to contact another user. Establishing the master session involves inviting another client to enter into the conversation. After the other client accepts the invitation, the master sessions are created on both the inviting client and the accepting client. The master session is established through a switchboard bridge, via an SB connection. The master session may be used later to establish feature sessions.

If an echo server test has not been conducted prior to the establishing operation 502, the establishing operation 502 may conduct an echo server test, to detect firewalls, NATs, or other active network devices that may be present. The echo server test involves sending a test message to an echo server (e.g., the echo server 112, FIG. 1), and the echo server responding with network address information corresponding to any active network devices that may be configured.

The user may want to communicate feature data in addition to the text data. Such feature data includes, but is not limited to files, pictures, custom emoticons, custom user tiles, and the like. In addition, the messenger application may create a feature session to transfer feature data. Thus, in another establishing operation 504, a feature session is established. The establishing operation 504 involves the master session creating a feature session at an inviting client and sending a feature invitation to a receiving client. When the feature invitation arrives at the receiving client, the invitation is either accepted or rejected.

Continuing with the establishing operation 504, if the feature invitation is accepted, the master session on the receiving client creates a feature session on the receiving client. The feature session on the receiving client has the GUID corresponding to the inviting feature. The master session on the receiving client also calls an invitation handler function that is registered for the GUID. If the feature invitation is accepted, the associated feature stores the feature session, so that the feature session can be used to interact with the transport API for the session. When the feature accepts, callback messages are sent to both the inviting feature and the accepting feature letting them know the session is ready for use to send and receive data. If the feature invitation is rejected, the master session deletes the feature session that was created.

Figure 6:
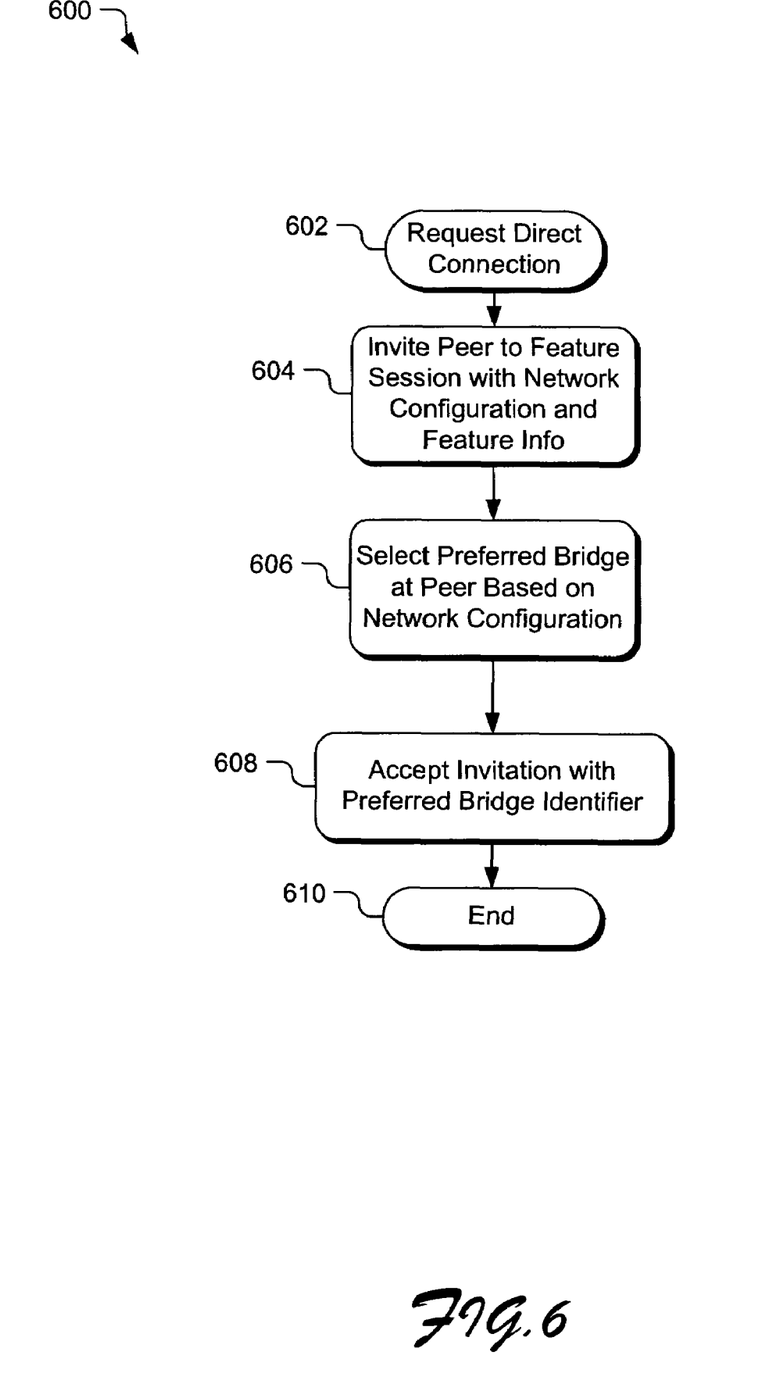
FIG. 6 illustrates an operation flow having exemplary operations for determining a preferred transport bridge and creating a direct connection using the preferred transport bridge.

The establishing operation 504 establishes the feature session through an existing connection, such as an established SB connection. More particularly, the feature session data is multiplexed with the master session data, as shown in FIG. 4, to carry on the feature session and the master session simultaneously. Because a connection through the switchboard may be slower than a peer-to-peer connection, a creating operation 506 attempts to create a direct (peer-to-peer) connection over which to conduct the feature session. An exemplary embodiment of the creating operation 506 is illustrated in FIG. 6, and described below. If a direct connection can be created, the feature session will be carried out using the direct connection. The operation flow 500 ends at an ending operation 508.

FIG. 6 illustrates an operation flow having exemplary operations for creating a direct connection. It is assumed that a user indicates to a feature at an initiating client that the user wants to change the feature session to a direct connection rather than the switchboard (SB) server. The user may prefer the direct connection because she wants to avoid being limited to a message size limit, or she wants to send more messages than allowed by the SB server, or perhaps she wishes to keep her messages inside her corporate firewall.

When the feature receives the indication to move to a direct connection, a requesting operation 602 executes, wherein the feature calls a method on the feature's slave session. The requesting operation 602 requests a direct connection. The slave session passes the request to the master session. In response, the master session sends a "reINVITE" message to the peer feature on a receiving client requesting a direct connection.

Continuing with the requesting operation 602, the "reINVITE" message contains information that identifies all transport bridge types supported by the inviting client. The feature session on the receiving client calls the invite handler function associated with the feature. The "reINVITE" may be accepted in any number of ways. In one implementation, the feature may have set an auto-accept setting in the feature's invitation handler. An auto-accept setting indicates that all requests for a direct connection are to be automatically accepted. In another implementation, an auto-reject setting may be set in the invite handler, which indicates that the direct connection request will be automatically rejected.

If neither an auto-accept or auto-reject setting is set, the transport will look to a global default value. If the global default value is set to accept or reject, the appropriate reply is made to the "reINVITE." If it is not set, the invited feature can respond to the invitation, for example, by prompting the user as to whether to accept or reject the "reINVITE." Assuming the "reINVITE" is accepted, a preferred transport bridge is identified in a selecting operation 606.

The selecting operation 606 selects a preferred transport bridge using preference factors as discussed above with respect to FIG. 3. An accepting operation 608 sends an accept message back to the inviting client. The accept message contains the preferred bridge. The acceptance also includes the accepting client's internal and external IPv4 addresses as well as an IPv6 global address if the client has one.

The transport on the other end will attempt to connect to the received IP address and port using the preferred bridge listed in the accept message. After the inviting client has connected, the transport sends a "RAK" and the accepting client replies with an "ACK." If the connection fails, the inviting client will time out after sending the "RAK". In one implementation, the inviting master session then sends another "reINVITE," this time excluding the transport bridge type that failed. The operation flow ends at an ending operation 610.

Figure 7:
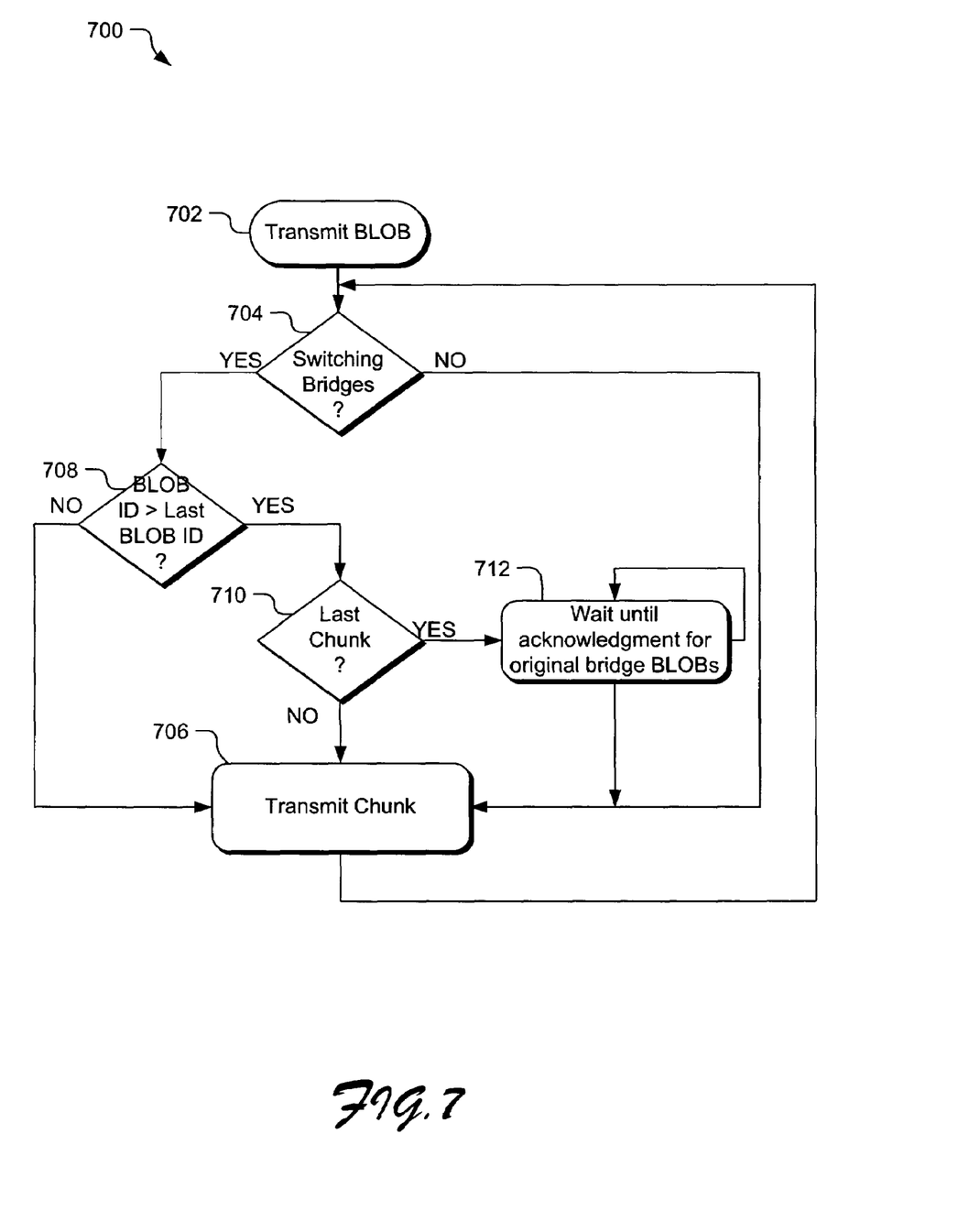
FIG. 7 illustrates an operation flow having exemplary operations for transporting binary large objects (BLOBs) in sequential order.

FIG. 7 illustrates an operation flow 700 having exemplary operations for transporting binary large objects (BLOBs) in sequential order. In general, before a last chunk of a BLOB is transmitted over a new direct connection, the transport waits to receive all "ACKs" associated with chunks of BLOBs that were previously transmitted over a non-direct connection. Waiting for "ACKS" in this fashion occurs, regardless of what type of transport bridge or connection (i.e., UDP, TCP, or otherwise) is being used.

A transmitting operation 702 begins transmitting a BLOB using a non-direct connection. A query operation 704 determines whether the transport bridge type has been switched to a direct connection. If the transport bridge type has not been switched the query operation 704 branches "NO" to a transmitting operation 706. The transmitting operation 706 transmits a chunk of the BLOB via the non-direct connection.

After the chunk is transmitted in the transmitting operation 706, the query operation 704 again determines whether the transport bridge type has changed. If the transport bridge type has changed, the query operation 704 branches "YES" to another query operation 708. The query operation 708 determines if a current BLOB identifier (ID) is greater than the last BLOB ID. If the current BLOB ID is not greater than the last BLOB ID, the query operation 708 branches "NO" to the transmitting operation 706, which transmits a chunk of the current BLOB.

If the query operation 708 determines that the current BLOB ID is greater than the last BLOB ID, then the query operation 708 branches "YES" to another query operation 710. The query operation 710 determines whether the current chunk to be transmitted is the last chunk in the BLOB. If the current chunk is not the last chunk in the BLOB, the query operation 710 branches "NO" to the transmitting operation 706, which transmits the current chunk. If the query operation 710 determines that the current chunk is the last chunk in the BLOB, the query operation 710 branches to a waiting operation 712. The waiting operation 712 waits until all ACKs are received for BLOBs that were transmitted via the original non-direct connection.

Figure 8:
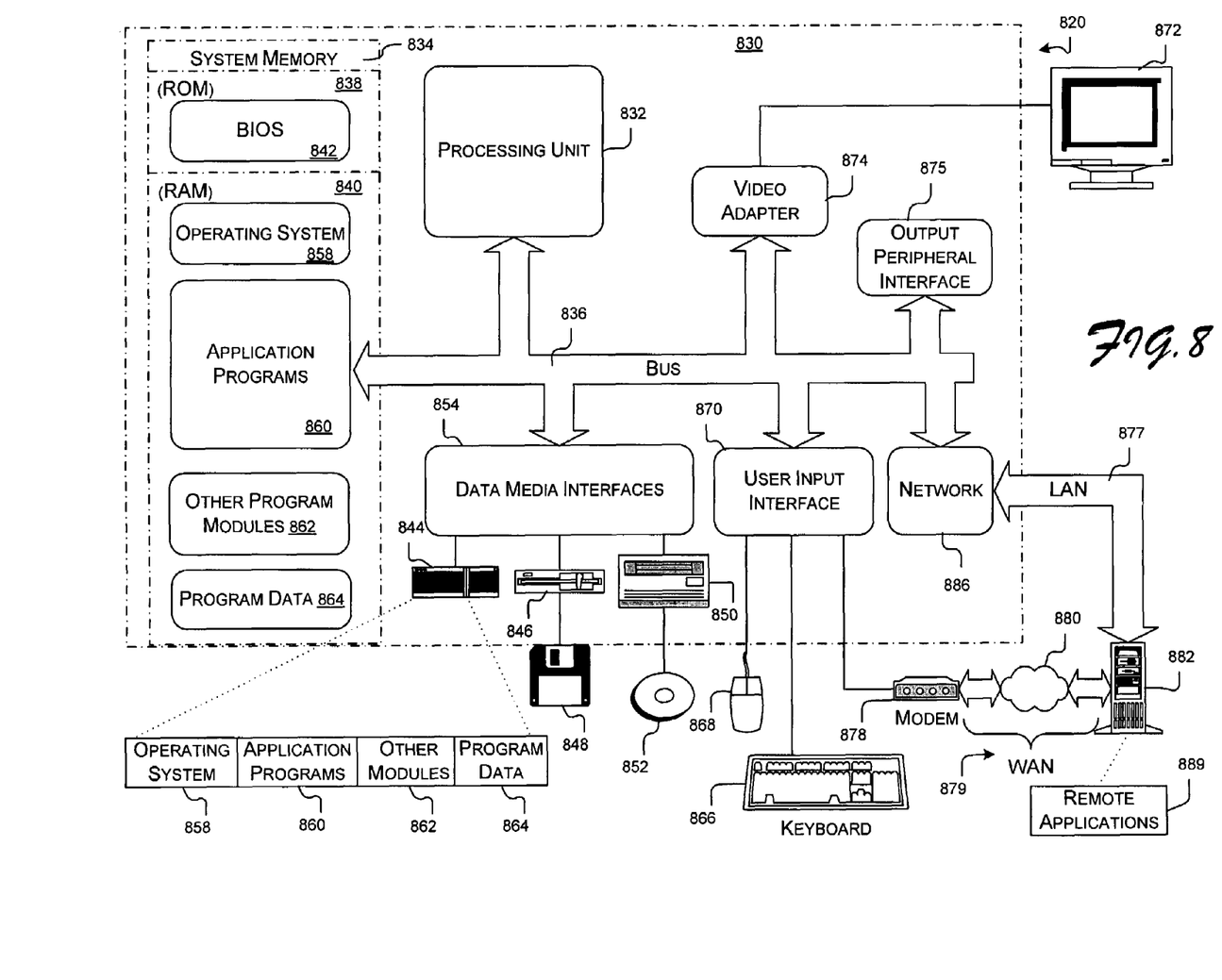
FIG. 8 illustrates an exemplary system that provides a suitable operating environment to transparently select a preferred transport bridge and communicate feature data in an instant messaging scenario.

An Exemplary Computer System that may be used in a Network Environment for Instant Messaging FIG. 8 and the corresponding discussion are intended to provide a general description of a suitable computing environment in which the described arrangements and procedures for transporting computer data may be implemented. Exemplary computing environment 820 is only one example of a suitable computing environment and is not intended to suggest any limitation as to the scope of use or functionality of the described subject matter. Neither should the computing environment 820 be interpreted as having any dependency or requirement relating to any one or combination of components illustrated in the exemplary computing environment 820.

The exemplary arrangements and procedures to transport computer data between interconnected devices are operational with numerous other general purpose or special purpose computing system environments or configurations. Examples of well known computing systems, environments, and/or configurations that may be suitable for use with the described subject matter include, but are not limited to, personal computers, server computers, thin clients, thick clients, hand-held or laptop devices, multiprocessor systems, microprocessor-based systems, mainframe computers, distributed computing environments such as server farms and corporate intranets, and the like, that include any of the above systems or devices.

The computing environment 820 includes a general-purpose computing device in the form of a computer 830. The computer 830 may include and/or serve as an exemplary implementation of a transport system for instant messaging described above with reference to FIGS. 1-7. The components of the computer 830 may include, by are not limited to, one or more processors or processing units 832, a system memory 834, and a bus 836 that couples various system components including the system memory 834 to the processor 832.

The bus 836 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The computer 830 typically includes a variety of computer readable media. Such media may be any available media that is accessible by the computer 830, and it includes both volatile and non-volatile media, removable and non-removable media.

The system memory includes computer readable media in the form of volatile memory, such as random access memory (RAM) 840, and/or non-volatile memory, such as read only memory (ROM) 838. A basic input/output system (BIOS) 842, containing the basic routines that help to communicate information between elements within the computer 830, such as during start-up, is stored in ROM 838. The RAM 840 typically contains data and/or program modules that are immediately accessible to and/or presently be operated on by the processor 832.

The computer 830 may further include other removable/non-removable, volatile/non-volatile computer storage media. By way of example only, FIG. 8 illustrates a hard disk drive 844 for reading from and writing to a non-removable, non-volatile magnetic media (not shown and typically called a "hard drive"), a magnetic disk drive 846 for reading from and writing to a removable, non-volatile magnetic disk 848 (e.g., a "floppy disk"), and an optical disk drive 850 for reading from or writing to a removable, non-volatile optical disk 852 such as a CD-ROM, DVD-ROM or other optical media. The hard disk drive 844, magnetic disk drive 846, and optical disk drive 850 are each connected to bus 836 by one or more interfaces 854.

The drives and their associated computer-readable media provide nonvolatile storage of computer readable instructions, data structures, program modules, and other data for the computer 830. Although the exemplary environment described herein employs a hard disk, a removable magnetic disk 848 and a removable optical disk 852, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 848, optical disk 852, ROM 838, or RAM 540, including, by way of example, and not limitation, an operating system 858, one or more application programs 860, other program modules 862, and program data 864. Application programs 860 may include an instant messaging application, utilizing features and a transport protocol stack, as discussed herein.

A user may enter commands and information into the computer 830 through optional input devices such as a keyboard 866 and a pointing device 868 (such as a "mouse"). Other input devices (not shown) may include a microphone, joystick, game pad, satellite dish, serial port, scanner, or the like. These and other input devices are connected to the processing unit 832 through a user input interface 870 that is coupled to the bus 836, but may be connected by other interface and bus structures, such as a parallel port, game port, or a universal serial bus (USB).

An optional monitor 872 or other type of display device is connected to the bus 836 via an interface, such as a video adapter 874. In addition to the monitor, personal computers typically include other peripheral output devices (not shown), such as speakers and printers, which may be connected through output peripheral interface 875.

The computer 830 may operate in a networked environment using logical connections to one or more remote computers, such as a remote computer 882. The remote computer 882 may include many or all of the elements and features described herein relative to the computer 830. The logical connections shown in FIG. 8 are a local area network (LAN) 877 and a general wide area network (WAN) 879. The LAN 877 and/or the WAN 879 can be wired networks, wireless networks, or any combination of wired or wireless networks. Such networking environments are commonplace in offices, enterprise-wide computer networks, intranets, and the Internet.

When used in a LAN networking environment, the computer 830 is connected to the LAN 877 via a network interface or an adapter 886. When used in a WAN networking environment, the computer 830 typically includes a modem 878 or other means for establishing communications over the WAN 879. The modem 878, which may be internal or external, may be connected to the system bus 836 via the user input interface 870 or other appropriate mechanism. Depicted in FIG. 8 is a specific implementation of a WAN via the Internet. The computer 830 typically includes a modem 878 or other means for establishing communications over the Internet 880. The modem 878 is connected to the bus 836 via the interface 870.

In a networked environment, program modules depicted relative to the personal computer 830, or portions thereof, may be stored in a remote memory storage device. By way of example, and not limitation, FIG. 8 illustrates remote application programs 889 as residing on a memory device of remote computer 882. It will be appreciated that the network connections shown and described are exemplary and other means of establishing a communications link between the computers may be used.

CONCLUSION

Although the described arrangements and procedures to have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

We claim:

1. A computer-readable medium having stored thereon computer-executable instructions for performing a method comprising:
    establishing an instant messaging session between a first client computer and a second client computer through a first connection via a switchboard server;
    establishing a peer-to-peer connection, comprising:
        initiating, at the first client computer, an invitation to the second client computer through the first connection to establish one or more feature sessions between the first client computer and the second client computer, the invitation identifying all transport bridge types supported by the first client computer;
        receiving, from the second client computer, an acceptance though the first connection in response to the invitation at the first client computer, the acceptance identifying at least one or more transport bridge types preferred at the second client computer;
        creating, on the basis of the received acceptance, the one or more feature sessions between the first client computer and the second client computer through a second connection, wherein the second connection is a peer-to-peer connection through the one or more preferred transport bridges;
    transmitting a first portion of a blob of first data associated with the instant messaging session though the first connection via the switchboard server; and
    transmitting, upon the establishment of the second connection, a subsequent portion of the blob of the first data associated with the instant messaging session through the peer-to-peer connection.

2. The computer-readable medium as recited in claim 1, the establishing a peer-to-peer connection further comprising:
    determining an active network device configuration associated with the first client computer and the second client computer; and
    selecting a peer-to-peer bridge corresponding to the active network configuration.

3. The computer-readable medium as recited in claim 2 wherein the peer-to-peer bridge comprises an RUDP bridge.

4. The computer-readable medium as recited in claim 2 wherein the peer-to-peer bridge comprises a TCP/IP bridge.

* * * * *

UNITED STATES PATENT AND TRADEMARK OFFICE
CERTIFICATE OF CORRECTION

PATENT NO.         : 7,363,378 B2                                Page 1 of 1
APPLICATION NO.    : 10/611575
DATED              : April 22, 2008
INVENTOR(S)        : John Holmes et al.

It is certified that error appears in the above-identified patent and that said Letters Patent is hereby corrected as shown below:

In column 16, line 37, in Claim 1, delete "though" and insert -- through --, therefor.

In column 16, line 48, in Claim 1, delete "though" and insert -- through --, therefor.

Signed and Sealed this
Fifteenth Day of February, 2011

David J. Kappos
*Director of the United States Patent and Trademark Office*